United States Patent
Ren et al.

(10) Patent No.: US 8,140,899 B2
(45) Date of Patent: Mar. 20, 2012

(54) METHOD AND SYSTEM FOR DIAGNOSING A COMPUTER SYSTEM

(75) Inventors: Zhangling Ren, Boise, ID (US); Glen Oliarny, Boise, ID (US); Shaun Henry, Middleton, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 19 days.

(21) Appl. No.: 12/785,997

(22) Filed: May 24, 2010

(65) Prior Publication Data

US 2011/0289355 A1    Nov. 24, 2011

(51) Int. Cl.
   *G06F 11/00* (2006.01)
(52) U.S. Cl. ............. 714/26; 714/4.1; 714/4.3; 714/4.4; 714/5.1; 714/25; 714/31
(58) Field of Classification Search ........... 714/4.1, 714/4.3, 4.4, 5.1, 25, 26, 31
   See application file for complete search history.

(56) References Cited

U.S. PATENT DOCUMENTS

| | | | |
|---|---|---|---|
| 6,260,048 B1 * | 7/2001 | Carpenter et al. | 1/1 |
| 6,681,344 B1 * | 1/2004 | Andrew | 714/38.14 |
| 6,789,215 B1 | 9/2004 | Rupp et al. | |
| 6,990,602 B1 | 1/2006 | Skinner et al. | |
| 7,073,093 B2 * | 7/2006 | Mannarsamy | 714/25 |
| 7,219,081 B1 | 5/2007 | Davis et al. | |
| 7,293,201 B2 * | 11/2007 | Ansari | 714/38.14 |
| 7,577,948 B2 | 8/2009 | Zomaya et al. | |
| 7,681,080 B2 | 3/2010 | Abali et al. | |
| 2003/0204558 A1 | 10/2003 | Schneider et al. | |
| 2006/0133283 A1 | 6/2006 | Weiner et al. | |
| 2007/0220487 A1 | 9/2007 | Wu et al. | |
| 2009/0132859 A1 * | 5/2009 | Pelley et al. | 714/37 |

* cited by examiner

*Primary Examiner* — Charles Ehne

(57) ABSTRACT

A method includes determining a rule lookup key for a computer system to be diagnosed, retrieving a diagnostic rule set associated with the rule lookup key, and executing the diagnostic rule set on the computer system. The computer system may include a computer and peripherals arranged in a configuration, and the diagnostic rule set executed on the computer system may be based on changes in configuration or behavior attributes of the computer system.

20 Claims, 7 Drawing Sheets

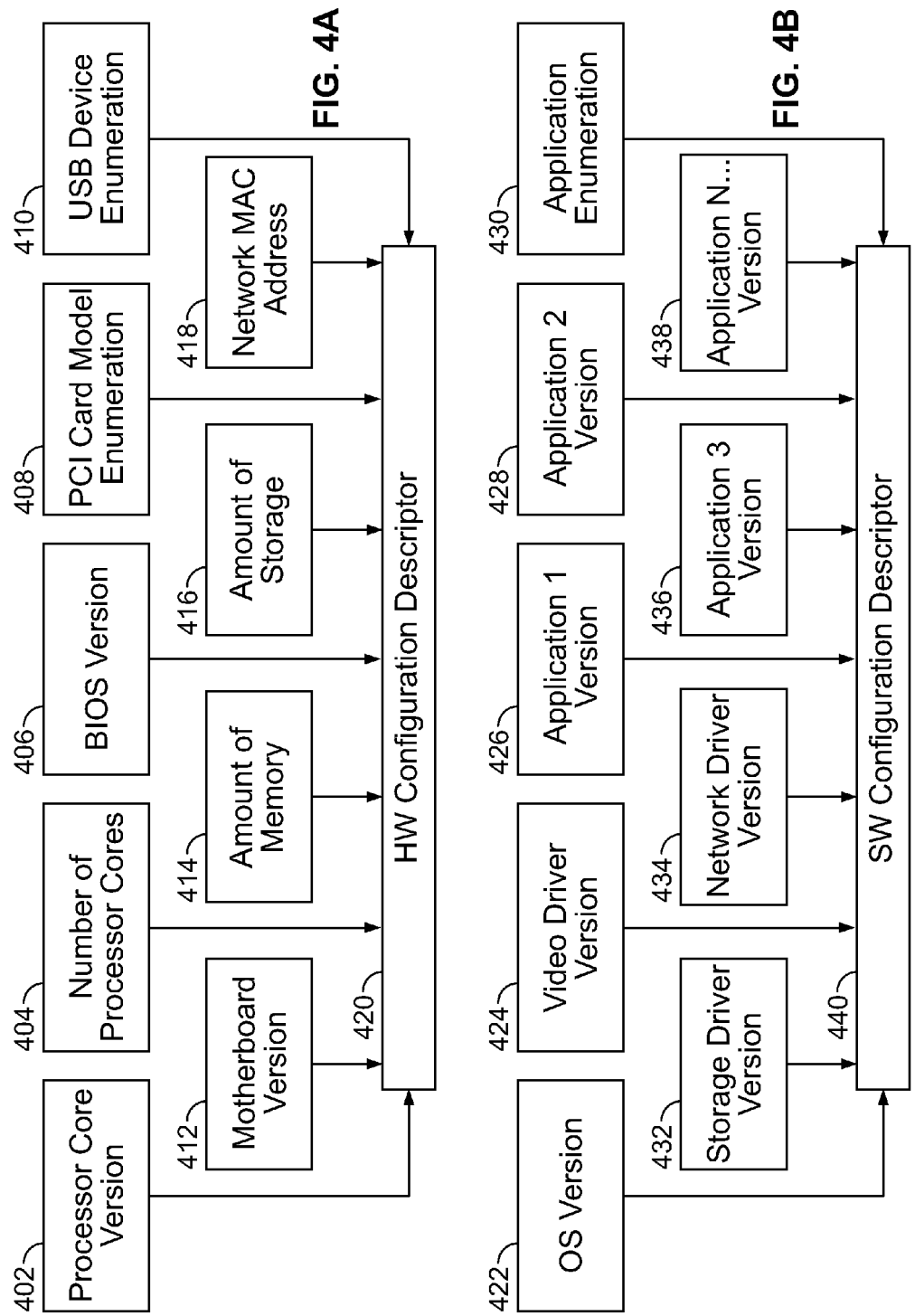

METHOD AND SYSTEM FOR DIAGNOSING A COMPUTER SYSTEM

BACKGROUND

When a computer boots up, or sometimes while the computer is operating, the computer may perform diagnostic and other preliminary tasks. These diagnostic tasks may test whether the internal memory (e.g., RAM, ROM) is operating correctly, whether internal or external peripherals such as drives or printers are working, whether parts of the computer system are operating correctly, whether wired or wireless network or other input/output (I/O) connections may be made, or whether the battery (in a laptop computer or a backup battery for a system component, for example) is working and how well.

BRIEF DESCRIPTION OF THE DRAWINGS

FIGS. 4A-4C are conceptual illustrations of the composition of rule lookup keys according to embodiments of the invention.

Figure 1:
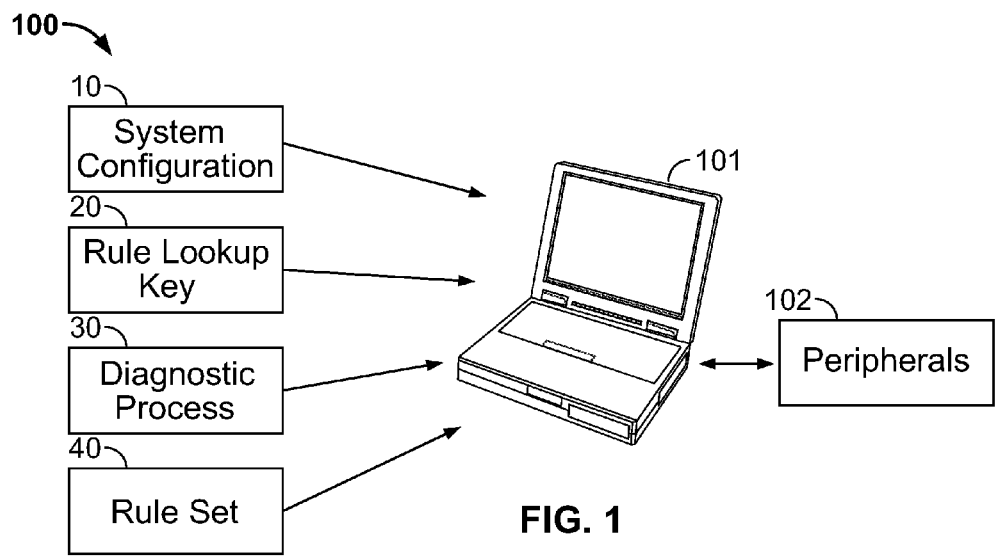
FIG. 1 is a conceptual illustration of a computer system having peripherals and associated components according to embodiments of the invention.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

Unless specifically stated otherwise, as apparent from the following discussions, it is appreciated that throughout the specification discussions using terms such as "processing," "computing," "calculating," "determining," or the like may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission, or display devices.

Embodiments of the present invention may be used in a variety of applications. Although the present invention is not limited in this respect, the circuits and techniques disclosed herein may be used in apparatuses such as computers, including personal computers (PCs), laptops, netbooks, desktops, servers, and mainframe computers, printers, presses, cameras, copiers, multi-function printers, consumer electronics, and the like.

As computer systems get larger and configurations get more complex, it is desirable to manage the systems and diagnose potential problems at an early stage so as to keep the systems running as inexpensively as possible. A diagnostic system may diagnose the various system configurations in order to provide critical information to customers, field technicians, and R&D engineers. As products mature throughout their life cycles, there may be numerous updates to the system configurations, some to the hardware configurations, some to the software configurations, and some to both configurations. Throughout these updates and modifications, the diagnostic system should provide consistent, complete, and correct analyses of the system, otherwise the warranty costs to the manufacturer may increase due to the high cost of defect investigation, since the warranty and technical support escalation process is very costly and can be very time consuming. The ability for a manufacturer to rapidly and accurately assess the state of a customer's system may help to maintain low warranty costs and provide the customer with an optimal experience.

One way to diagnose a system may be to keep track of the system configurations that are manufactured and shipped, and develop rule sets that are associated with each system configuration. Embodiments of the invention may provide a diagnostic process and system to analyze a computer system throughout the numerous hardware and software updates that the product may experience during its life cycle, allow the diagnostic system to be updated for new hardware and/or software platform configuration changes, and allow for the definition of multiple baseline system configurations that can be updated even when the system is at a customer's site, without the need to re-write the computer system's software.

Since there may be a plurality of hardware/software combinations sold by a manufacturer (and upon which the diagnostic system may be installed), the diagnostic system should be able to programmatically detect, possibly by using various attributes or characteristics of the system being analyzed, which system configuration it is analyzing. Those characteristics may then be compared to a listing of known valid hardware and software configurations. When a matching hardware/software configuration is located, the diagnostic system may load a diagnostic rule set which may instruct the diagnostic system how to query the computer system being analyzed and how to interpret the results of the various queries. The rules may include information upon which the diagnostic system acts to determine if the computer system being analyzed is in compliance with the various rules for that particular hardware/software configuration.

Reference is now made to FIG. 1, a conceptual illustration of a computer system 100 according to embodiments of the invention. Computer system 100 may include computer 101 and peripherals 102. Computer 101 may be a server, a personal computer, laptop, netbook, desktop, or mainframe computer. Peripherals 102 may include printers, internal or external drives, network connections, displays, graphic and imaging devices, etc. Internal or external drives may include hard disk drives, floppy drives, CD drives, DVD drives, flash drives, and/or solid-state drives.

Associated with computer system 100 and/or computer 101 may be a system configuration 10, which, among other elements, may comprise a machine usage context, a hardware configuration, and a software configuration. In other words, computer system 100 may have a system configuration 10 comprising the role played by (i.e., machine usage context of) computer system 100, such as system manager, raster image processor, or press controller; the hardware devices, peripherals, and other hardware aspects (hardware configuration)

comprising computer 101; and the software programs, procedures, routines, and drivers (software configuration) running on computer 101. Associated with system configuration 10 may be a rule lookup key 20, a diagnostic process 30, and a rule set 40. Rule lookup key 20 (also called a "configuration key") may be derived from system configuration 10, and will be discussed in more detail below. Diagnostic process 30 may be a method, process, or program that may diagnose the attributes of computer system 100. Rule set 40 may be invoked by diagnostic process 30 and may include rules to analyze, configure, and/or diagnose computer system 100.

The blocks shown in FIG. 1 are examples of modules or devices that may be part of computer system 100 or part of or connected to or associated with computer 101, and do not limit the types of modules and devices that may be part of or connected to or associated with computer system 100 or computer 101.

Figure 2A:
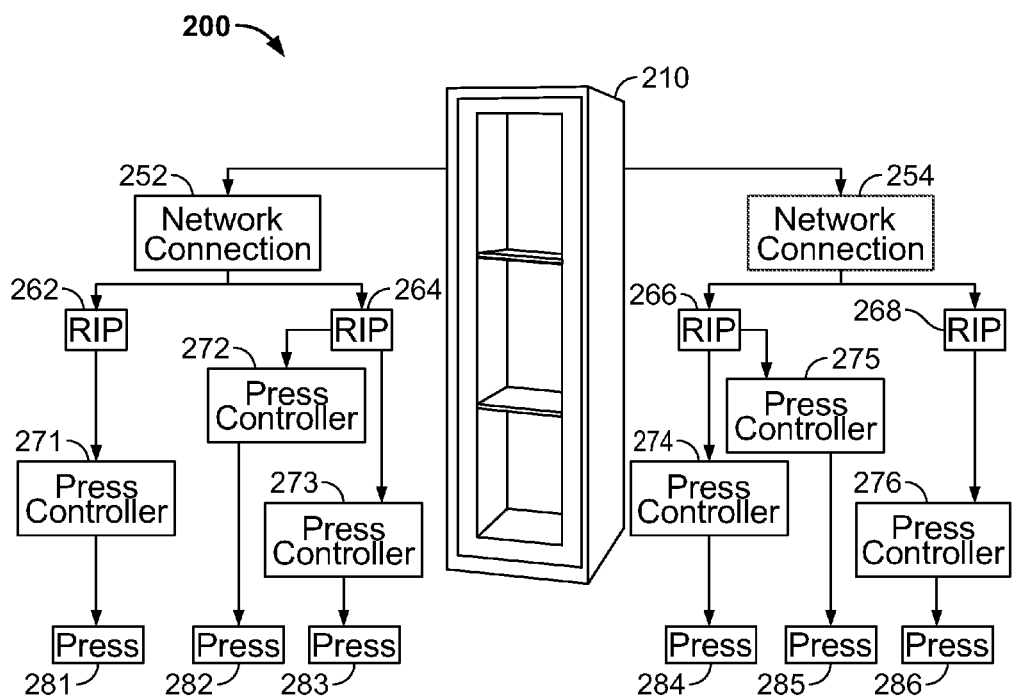
FIGS. 2A and 2B are conceptual illustrations of a printing system according to embodiments of the invention.

One embodiment of the invention may be realized using a printing system, which may include a print system manager, raster image processors (RIPs), press controllers, and presses, which may be connected using various network connections. As shown in FIG. 2A, a conceptual illustration of a printing system 200 according to embodiments of the invention, printing system 200 may include system manager 210, RIPs 262-268, press controllers 271-276, presses 281-286, and network connections 252, 254.

Figure 2B:
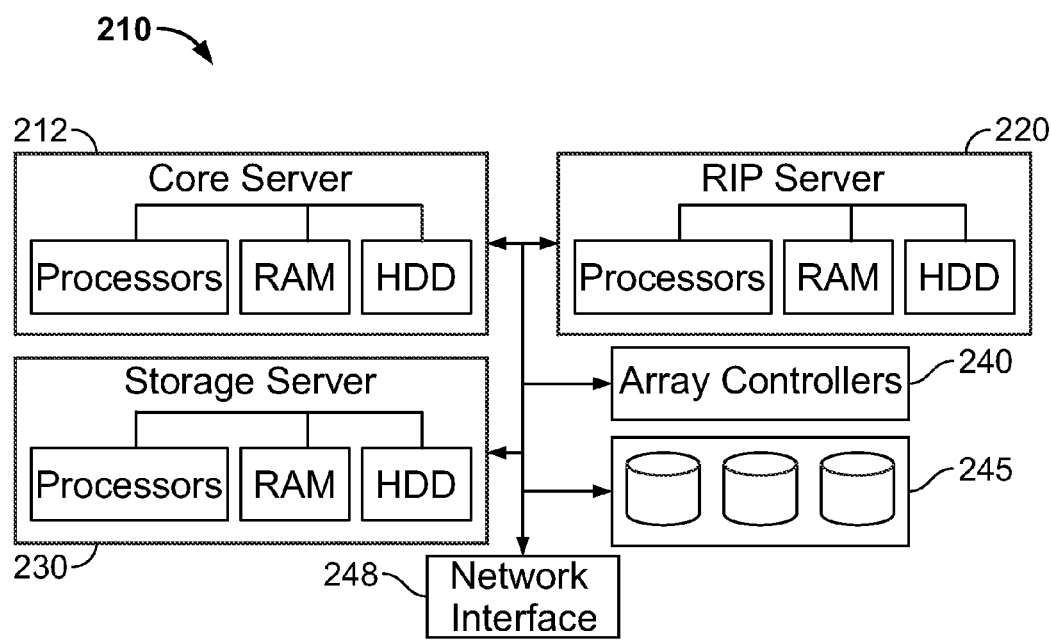

System manager (or print system manager) 210 is generally a computer that may include (or can access) several servers and/or processors or processor cores. As shown in FIG. 2B, system manager 210 may include core server 212, RIP server 220, storage server 230, array controllers 240, non-volatile storage 245, and network interface 248. Core server 212 may be the main server, controlling the other servers in system manager 210. An example of core server 212 may be an HP ProLiant ML360 G6 Server, which may have one or more processors, such as an Intel® Xeon® Processor, each of which in turn may include two, four, or six or more processor cores. Core server 212 may also include random access memory (RAM) (e.g., 2-8 GB or more) and non-volatile storage (shown in FIG. 2B as "HDD"), which may comprise one or more hard drives providing hundreds of gigabytes (GB) or several terabytes (TB) of storage. Core server 212 may be running a server-type operating system, such as Microsoft Windows Server 2008 R2 Standard. Examples of system managers 210 are HP® SmartStream's line of products, including the Production Pro Print Server, Production Plus Print Server, and Ultra Print Server.

RIP server 220 may control RIPs 262-268 in printing system 200. An example of RIP server 220 may be an HP ProLiant BL460c Server, which may have one or more processors, such as an Intel® Xeon® Processor, each of which in turn may include two, four, or six or more processor cores. RIP server 220 may also include RAM (e.g., 2-8 GB or more) and possibly non-volatile storage (HDD), which may comprise one or more hard drives providing hundreds of gigabytes (GB) or several terabytes (TB) of storage. RIP server 220 may be running a server-type operating system, such as Microsoft Windows Server 2008 R2 Standard.

Storage server 230 may control the various storage volumes in printing system 200. An example of storage server 230 may be an HP ProLiant DL380 G5 Storage Server, which may have one or more processors, such as an Intel® Xeon® Processor, each of which in turn may include two, four, or six or more processor cores. Storage server 230 may also include RAM (e.g., 2-8 GB or more) and non-volatile storage (HDD), which may comprise one or more hard drives providing hundreds of gigabytes (GB) or several terabytes (TB) of storage.

Storage server 230 may be using NAS (network attached storage) or running a SAN (storage area network). Storage server 230 may be running a server-type operating system, such as Microsoft Windows Server 2008 R2 Standard.

System manager 210 may include one or more disk array controllers 240, which manage the physical storage drives 245 and present them to core server 212 as logical units. Array controllers 240 may implement hardware RAID (redundant array of independent disks), and thus may sometimes be called "RAID controllers." Array controllers 240 may also provide additional disk cache. An array controller may optionally include a battery for backup purposes. Examples of array controllers 240 are the HP P410i and P800.

Wherever located in printing system 200, non-volatile storage (e.g., 245 and the HDD within or connected to the several servers) may be serial attached SCSI (SAS), serial ATA (SATA), solid state drives, optical drives, USB drives, etc.

System manager 210 may include network interface 248, which allows system manager 210 to communicate with RIPs 262-268 and other servers and/or printing system and the Internet. Network interface 248 may connect with network connections 252 and 254, one or more of which may connect to a local area network (LAN), metropolitan area network (MAN), or wide area network (WAN), and one or more of which may connect wirelessly or via wires to the Internet.

Printing system 200 includes RIPs 262-268. A RIP (raster image processor) may translate a high level printing (page description) language, such as HP PCL (page control language), PostScript, or PDF (portable document format), and may produce a raster image or a bitmap. The bitmap may be sent to a press controller which then prints it on a press. The RIPs in printing system 200 are shown as standalone hardware devices, but RIPs may also be implemented as a software component of an operating system or as a firmware program executed on a microprocessor inside a printer. Like the servers that are part of system manager 210, a RIP may be an HP ProLiant DL360 G6 Server, which may have one or more processors, each of which in turn may include two, four, or six or more processor cores. A RIP may also include RAM and/or non-volatile storage, which may comprise one or more hard drives providing hundreds of gigabytes (GB) or several terabytes (TB) of storage. A RIP may run a server-type operating system, such as Microsoft Windows Server 2008 R2 Standard.

Press controllers 271-276 may be computers that control a specific offset or digital printing press. Like the RIPs and servers that are part of system manager 210, a press controller may be an HP ProLiant DL380 G6 Server, which may have one or more processors, each of which in turn may include two, four, or six or more processor cores. A press controller may also include RAM and/or non-volatile storage, which may comprise one or more hard drives providing hundreds of gigabytes (GB) or several terabytes (TB) of storage. A press controller may run a server-type operating system, such as Microsoft Windows Server 2008 R2 Standard.

Presses 281-286 are devices that print output. They may be digital or non-digital offset presses, and may be sheet-fed or web-fed presses. Examples of presses may be commercial sheet fed presses, commercial web fed presses, and labels and packaging presses such as the HP 7000, 5000, W7200, W3250, WS6000, and ws4500 digital presses.

The descriptions of printing system 200 and system manager 210 are provided to illustrate embodiments of the invention. More or fewer blocks or components may exist within printing system 200 and system manager 210; functions of RIPs and/or press controllers, although shown as being separate from the system manager, could be performed by the system manager itself. Moreover, printing system 200 is only one example of a "product" that includes several computer systems 100. System manager 210, each of RIPS 262-268, and each of press controllers 271-276 are examples of a computer system 100. Besides printing systems and the various subsystems, other embodiments of the invention could include local area networks, file server systems, video server systems, photo server systems, and web server systems—essentially any type of computer system having a plurality of hardware/software configurations when manufactured and which may change over time.

In embodiments of the invention, each computer system may be identified by specific hardware and software attributes. A baseline configuration may be provided by the manufacturer for each unique, supported hardware and software platform configuration. Some embodiments of this invention may store these baseline configurations as a record in a database, as a unique hash value in a hash map, or in other ways, as long as there may exist a unique signature of a computer system's hardware/software configuration. It is this signature that may be used to determine the correct rule set to use when analyzing the computer system and creating a diagnostic overview of the computer system's compliance with the chosen rule set.

At runtime, the specific hardware and software attributes may be retrieved from a computer system (e.g., server machine) that the diagnostic system is analyzing. This information may be used to identify the appropriate configuration baseline (e.g., the configuration at purchase or a previous configuration at a certain date or at startup) for a system and verify whether the hardware and software platform is supported. A computer system may be diagnosed based on its own hardware and software attributes and its supported baseline. These attributes may include the configuration of the hardware and software as well as system behavior or performance. The rule set may be used to dynamically configure the diagnostic system based upon the hardware and/or software attributes as discovered at runtime during the initialization of the computer system. There may be multiple rule sets that define how to diagnose a particular computer system. The selection of the rule set applicable to the particular computer system may be made during runtime of the diagnostic system. This may allow the diagnostic system to be configured in a dynamic manner such that the computer system being diagnosed does not need to be modified when new diagnosis rules are created and deployed to the diagnostic system. This will be described later in reference to FIG. 5B.

After analysis, a diagnostic report may be generated that includes the results of the diagnostic analysis. The diagnostic system may report data regarding hardware and software attribute mismatches when compared against the baseline. Additionally, the diagnostic system may report data regarding the status of a hardware or software component within the system being diagnosed.

Figure 3:
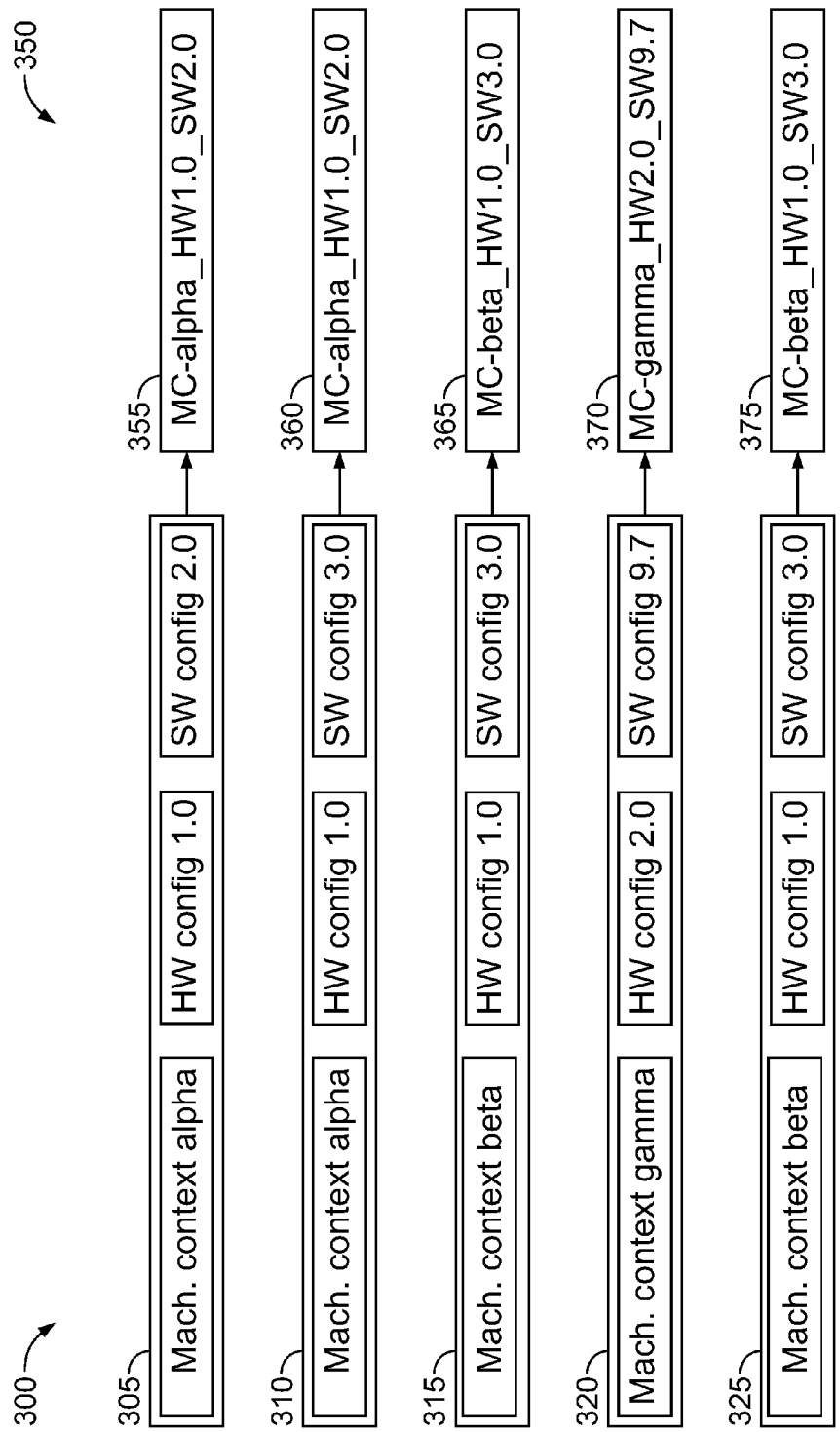
FIG. 3 is a schematic of possible configurations of computer systems according to embodiments of the invention.

Reference is now made to FIG. 3, a schematic of possible configurations of computer systems according to embodiments of the invention. On the left is a list 300 of the various computer systems being diagnosed, and on the right are the associated rule lookup keys 350. Five computer systems 305-325 are listed, which may make up a product as described above. Each computer system may have a machine usage context, a hardware configuration descriptor, and a software configuration descriptor. These three attributes are examples of attributes that may be used to identify a computer system. In FIG. 3, the machine usage context may be alpha, beta, or gamma, which may stand for, for example, system manager, RIP, press controller, or NAS (network-attached storage); the hardware configuration may be version 1.0 or 2.0, and the software configuration may be version 2.0, 3.0, or 9.7. Each of the systems' configurations can be used to generate a rule lookup key 355-375 that may then be used to look up the appropriate diagnostic rule set for that system. Note that system configurations need not be unique, that is, multiple systems within a product can have the same configuration. See, for example, configurations 315 and 325.

For example, computer system 305 has machine usage context alpha, hardware configuration version 1.0, and software configuration version 2.0. Rule lookup key 355 for computer system 305 is thus MC-alpha_HW1.0_SW2.0. Other rule lookup keys may be used, so long as they point to the correct rule set for that computer system.

In this example, in an embodiment of the invention, after the diagnostics system recognizes the rule lookup key, it may perform the following. For a system having the rule lookup key MC-alpha_HW1.0_SW2.0, first the rule set for the rule lookup key (called, e.g., "rule set MC-alpha_HW1.0_SW2.0") may be loaded, then the computer system may be analyzed and diagnosed based on rule set MC-alpha_HW1.0_SW2.0, and finally a report may be generated based on the analysis.

Figure 4C:
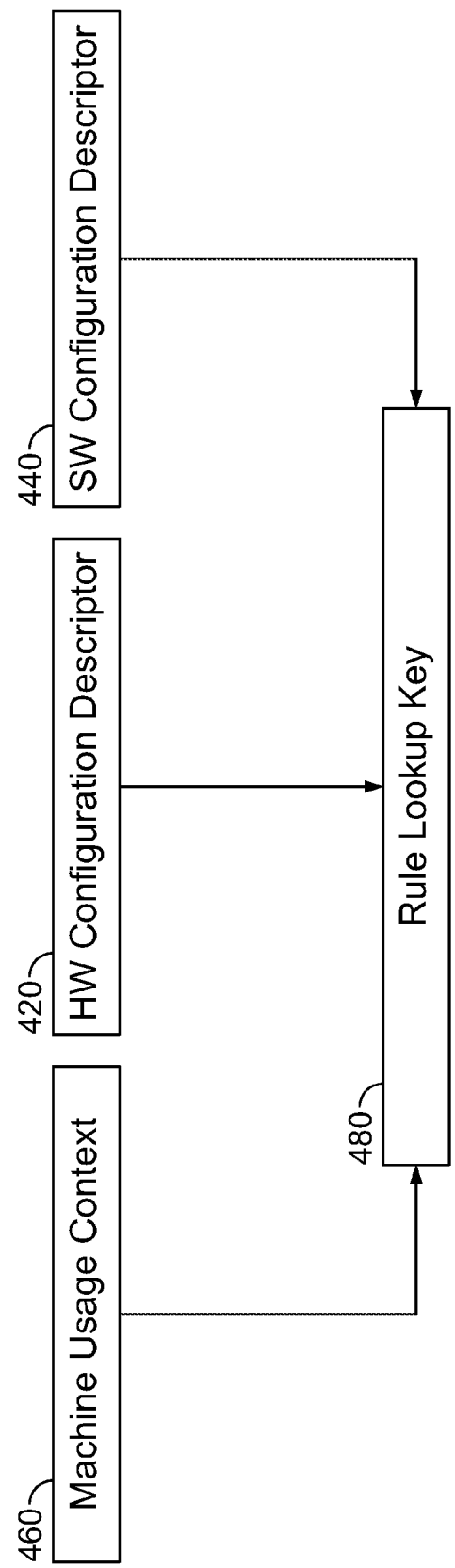

Reference is now made to FIGS. 4A-4C, which are conceptual illustrations of the composition of rule lookup keys, according to embodiments of the invention. A hardware configuration may comprise a number of elements, such as processor core version 402, number of processor cores 404, BIOS version 406, PCI card model enumeration 408, USB device enumeration 410, motherboard version 412, amount of memory (RAM) 414, amount of storage 416, and network MAC address 418, to name a few. An example of such a hardware configuration may include a Xeon processor, Model 5560, with four processor cores, running at 3.1 GHz, and hardware version 3; a RAID storage array, Model 3425, running RAID level 5, with 2 TB storage, and hardware version 7.2; and a network connection, Model 34668, with a 10/100/1000 network card, and hardware version 5.2.3. All of these elements in FIG. 4A are used to derive the hardware configuration descriptor 420, which in this example may be "Xeon_M5560_4c_3.1g_HWV3-RSA_M3425_RAID5_2TB_HWV7.2-M34668_N1000_HWV5.2.3." This may be considered the hardware descriptor portion of the rule lookup key referred to as "HW1.0" in FIG. 3.

A software configuration may comprise a number of elements, such as operating system version 422, video driver version 424, application 1 version 426, application 2 version 428, application enumeration 430, storage driver version 432, network driver version 434, application 3 version 436, and application N version 438, to name a few. An example of such a software configuration may include Microsoft Windows Server 2008, R2 Standard, Remote Command Service, and software version 3.3; Digital Front End (DFE) Application Services, Synchronization manager, Job manager, Communication manager, and software version 2.1; and Processes, PaperManager.exe, Image_handler.exe, ThroughputManager.exe, and software version 8.2. All of these elements in FIG. 4B are used to derive the software configuration descriptor 440, which in this example may be "MSW2008_R2Std_RemCmdSvc_SWV3.3-DFEApp_SyncMgr_JobMgr_CommMgr_SWV2.1-Processes_PaperMgr_ImgHndler_ThruputMgr_SWV8.2." This may be considered the software descriptor portion of the rule lookup key referred to as "SW2.0" in FIG. 3.

FIG. 4C shows that rule lookup key 480 is made up of hardware configuration descriptor 420, software configuration descriptor 440, and machine usage context 460. Machine usage context 460 may be the role or context of the computer system within the product, such as system manager (SM), raster image processor (RIP), press controller (IPC), or network-attached storage (NAS). So, "MC-alpha" in rule lookup keys 350 may be "SM," MC-beta may be "RIP," MC-gamma may be "IPC," and MC-delta may be "NAS." Rule lookup key 480 may include the full machine usage context-HW configuration descriptor-SW configuration descriptor, which, using the above examples could be SM_Xeon_M5560_4c_3.1 g_HWV3-RSA_M3425_RAID5_2TB_HWV7.2-M34668_N1000 HWV5.2.3_MSW2008_R2Std_RemCmdSvc_SWV3.3-DFEApp_SyncMgr_JobMgr_CommMgr_SWV2.1-Processes_PaperMgr_ImgHndler_ThruputMgr_SWV8.2. This may use the shorthand of FIG. 3 to become MC-alpha_HW1.0_SW2.0.

Figure 5A:
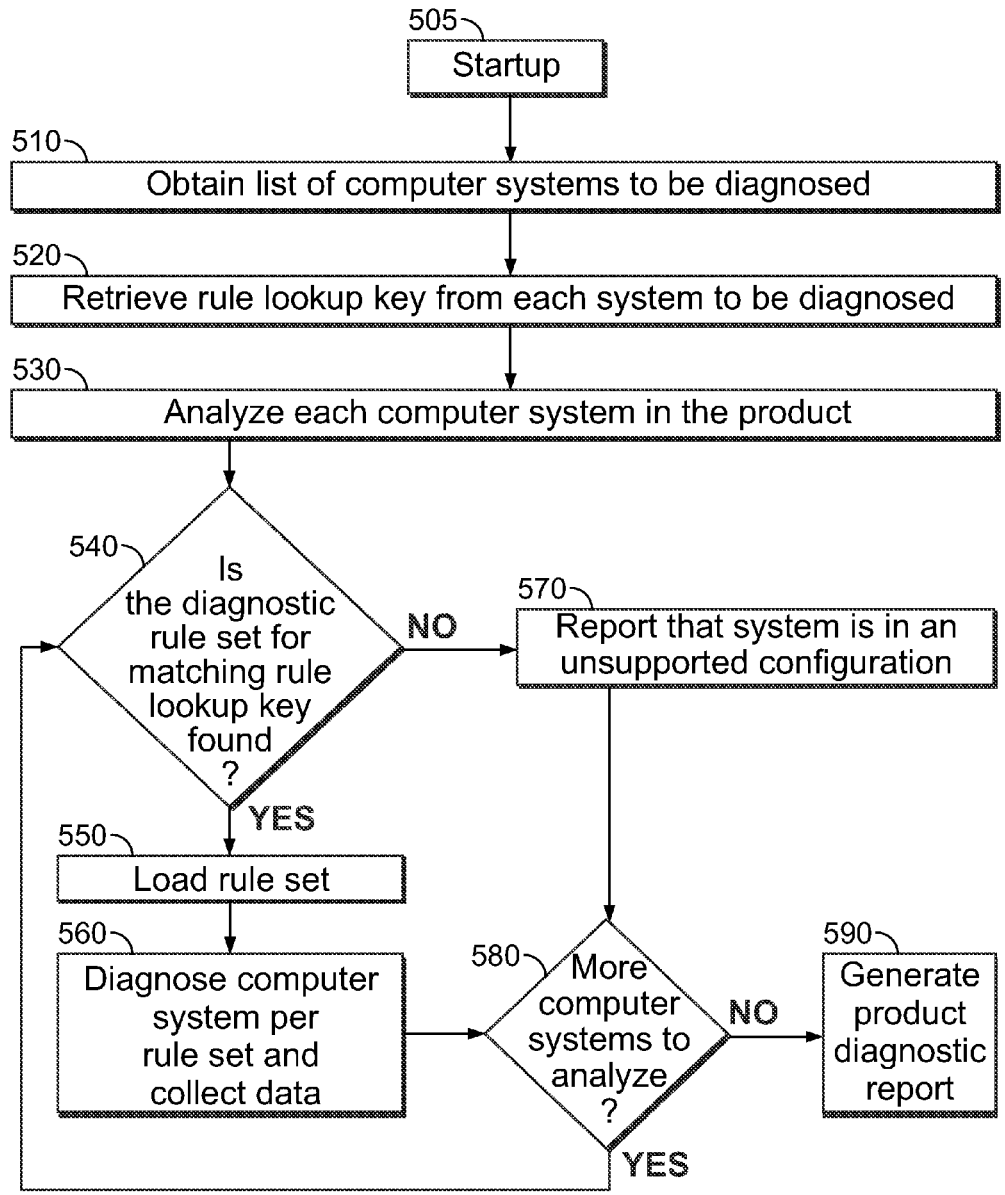
FIGS. 5A-5B are flowcharts illustrating operation of a diagnostic system according to embodiments of the invention.

Reference is now made to FIG. 5A, a flowchart illustrating in more detail the operation of the diagnostic system according to embodiments of the invention. In operation 505, the computer and diagnostic systems start up. In operation 510, the diagnostic system obtains a list of computer systems in a product to be diagnosed. In operation 520, the diagnostic system may query/retrieve the rule lookup key from each computer system to be diagnosed. This analysis may occur in parallel where multiple systems are concurrently diagnosed. In operation 530, the diagnostic system may analyze each computer system in the product. This may include querying the target computer system for current configuration data as well as running diagnostic routines to obtain detailed information that may not be readily available. In operation 540, the diagnostic system looks for the rule set to match the system rule lookup key. If the rule set is found, in operation 550, the rule set for the rule lookup key may be loaded. In operation 560, based on the loaded rule set, diagnosis of the computer system is performed and data are collected.

Figure 5B:
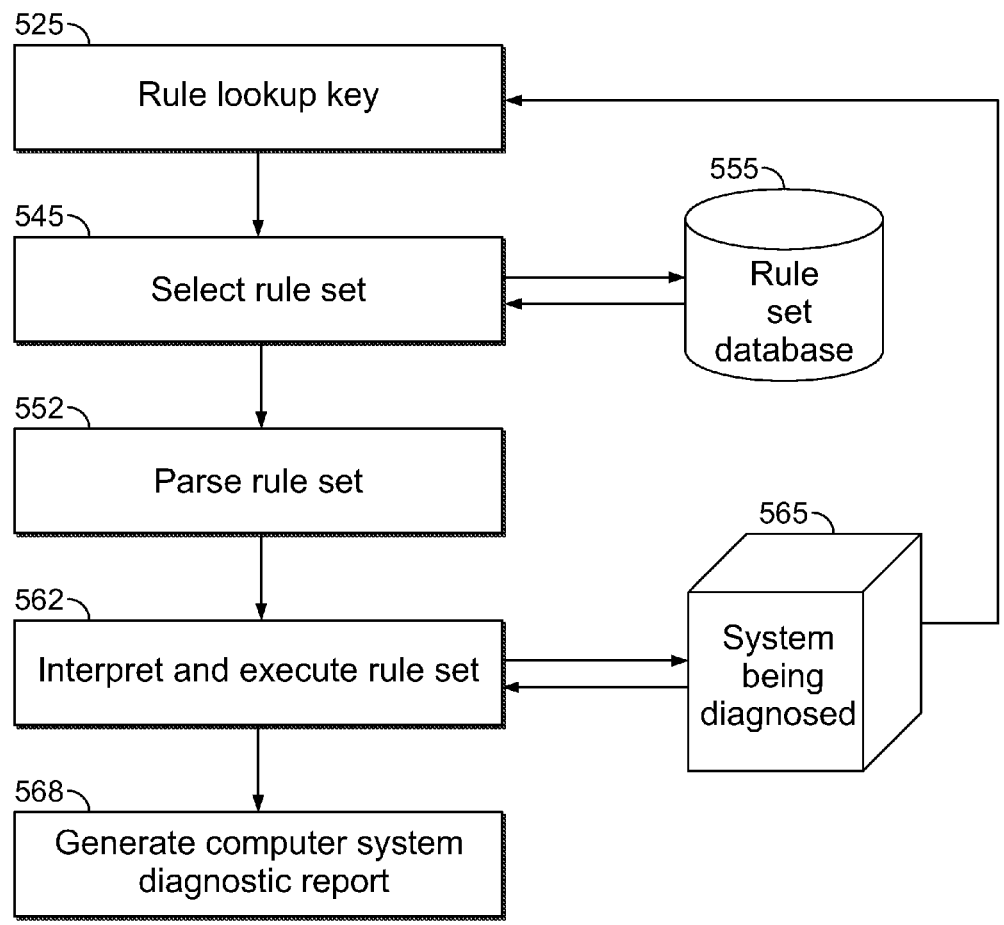

An alternative way of considering operations 520-560 is shown in FIG. 5B. In operation 525, as part of or as a follow-up to operation 520, once the diagnostic system has queried or retrieved the rule lookup key from each computer system to be diagnosed, it may then identify a set of pre-defined queries based on the rule lookup key, and execute the pre-defined queries against a specific computer system to determine what the computer system is. One of the inputs to operation 525 is the system being diagnosed 565, which indicates that the rule lookup key process may be dynamic, as described earlier. In operation 545, the rule set based on the matching rule lookup key may be selected from rule set database 555. The rule lookup key may be used to query rule set database 555, which may be, for example, a database or a web service, to load the appropriate diagnostic rule set for the particular computer system that is being diagnosed. Once the rule set is selected, in operation 552, the rule set is parsed. In operation 562, the rule set is interpreted and executed on the computer system 565 being diagnosed. In operation 568, a report based on the computer system's diagnosis may be generated.

Returning to FIG. 5A, if the rule set is not found in operation 540, then, in operation 570, the diagnostic system reports that the computer system may have an unsupported configuration. In operation 580, it is determined whether all of the computer systems have been diagnosed. If not, the flow returns to operation 540. After all of the computer systems in the product have been diagnosed, in operation 590, a report based on the diagnoses of the product may be generated. The report could be made available immediately after a diagnosis is completed on one of the computer systems or after diagnoses are completed on all of the computer systems.

Besides the operations shown in FIGS. 5A and 5B, other operations or series of operations may be used to determine the rule lookup key and the proper diagnostic rule set for a computer system or systems. Moreover, the actual order of the operations in the flowcharts may not be critical.

A feature of embodiments of this invention is the ability of the product manufacturer to define a set of rules which are applied only to a system with a matching hardware/software rule lookup key. The rules can be described or implemented in a meta language such as XML or in an active, programmatic language such as BASIC, TCL, Perl, Groovy (for the Java Virtual Machine), etc.

Attributes that may be used to determine the rule lookup key of a system may include, without limitation, SystemRole, SubType, HardwareGeneration, RaidConfiguration, NumberOfCores, Version, and ComponentMode. The attribute SystemRole may denote the role the computer system plays within the entire product (e.g., machine usage context), and may have values such as system manager (SM), RIP, press controller, network-attached storage (NAS), Tower, or N/A. The attribute SubType may denote a further refinement of the computer system's role and type, and may have values such as 7000 (HP 7000 press), 7200 (HP W7200 press), "combo" (e.g., a single server that performs more than one role, such as a combination system manager and press controller), "split" (e.g., where each system manager, press controller, or RIP is installed on separate server systems), or N/A. The attribute HardwareGeneration may denote the overall product generation the hardware belongs to, and may include G5, G6, or N/A. (G5 and G6 are HP ProLiant Server generations.) The attribute RaidConfiguration may denote how the storage is configured on the system, and may include Raid0, Raid1, Raid5, or N/A. The attribute NumberOfCores may denote how many processing cores exist on the system, and may include 2, 4, 6, 8, or N/A. The attribute Version may denote the version of the hardware or software component currently installed on the system, and may include 1.0, 2.0, 3.0, 4.1, 9.7, etc. The attribute ComponentMode may denote the mode the component currently operates under or how the component is configured to operate, and may include Single RIP, Multiple RIP, etc.

As a more detailed example, assume a printing system 200 having system manager 210, four RIPs 262-268, and six press controllers 271-276, as shown in FIG. 2A. Printing system 200 thus includes eleven computer systems 100, and each one can be analyzed and diagnosed. System manager 210 may have system configuration "DL380 G6 Running Microsoft Windows Server 2008 R2 Standard" if the server is an HP ProLiant DL380 G6 server running Microsoft Windows Server 2008 R2 Standard. Such a configuration may yield rule lookup key "sm1." RIP 262 may have system configuration "DL360 G6 Running Microsoft Windows Server 2008 R2 Standard" if the server is an HP ProLiant DL360 G6 server running Microsoft Windows Server 2008 R2 Standard. Such a configuration may yield rule lookup key "rip1_4." RIPs 264-268 may have configurations different from RIP 262, but in many cases it might be easier for all the RIPs to have the same configuration. Press controller 271 may have system configuration "DL380 G6 Running Microsoft Windows Server 2008 R2 Standard" if the server is an HP ProLiant DL380 G6 server running Microsoft Windows Server 2008 R2 Standard. Such a configuration may yield rule lookup key "ipc1_7000" (where "ipc" stands for Indigo Press Controller). Press controllers 272-276 may have configurations different from press controller 271, but in many cases it might be easier for all the press controllers to have the same configuration. Note that the configurations of press controllers 271-276 in this example happen to be the same as the configuration of system manager 210.

According to the flowchart in FIG. 5A, the product (printing system 200), its computer systems, and the diagnostic system may start up in operation 505. In operation 510, the diagnostic system may obtain a list of the eleven computer systems 100 that comprise printing system 200. In operation 520, the diagnostic system may query/retrieve the rule lookup key from each of the eleven computer systems. In this example, that would be sm1 for the system manager, rip1_4, for the RIPs, and ipc1_7000 for the press controllers. In operation 530, the diagnostic system may analyze each computer system in the product. In operation 540, the diagnostic system may look for the rule set to match the system rule lookup key. In this example, that would be sm1_rules.txt for the system manager, rip1_4_rules.txt, for the RIPs, and ipc1_7000_rules.txt for the press controllers. Since the rule set is found, in operation 550, the first rule set for the rule lookup key may be loaded, and in operation 560, based on the loaded rule set, diagnosis of the computer system may be performed.

For system manager 210, diagnosis may involve setting warning flags or error flags if configurations or operations are incorrect. The rule set "sm1_rules.txt" may display an error if the machine info is not equal to "DL380 G6 Running Microsoft Windows Server 2008 R2 Standard." The rule set may display a warning if the CPU clock speed is less than one benchmark (e.g., 2800 MHz) or an error if it is less than a lower benchmark (e.g., 2633 MHz). Other attributes of the system manager diagnosed may include the number of total processor cores, available memory (in percent), total memory (in MB), and page file availability (in percent). Next, the rule set may diagnose the array controllers associated with the system manager, displaying a warning or an error based on the accelerator ratio, the battery summary, the controller summary (e.g., which controller type is being used and in which slot it is located), the firmware version in use, the cache size, the size of the drive cache, and the status of the drive cache, for example. The rule set may then diagnose the volumes associated with the system manager, making sure various drives are being used, the amount of total capacity on each drive, and the amount of free drive space available. Next, the rule set may diagnose the external network connection, checking the maximum receive and transmit speeds, the wireless mode being used, the NIC (network interface card) version being used, and the IP address of the connection. The rule set may also check to make sure certain processes, operating system services, application services, and environment variables are running on the subject computer system. In some computer systems, the rule set may make sure certain component versions match expectations and the directories and folders are present.

In operation 568, a report based on the computer system's diagnosis may be generated. For system manager 210, this report may include a summary of flagged items and a listing of the attributes of the computer system even if they do not deviate from the expected configuration. The report may also color code errors and warnings, using, for example, RED for errors and YELLOW for warnings.

In operation 580, it is determined whether all of the computer systems have been diagnosed. Since the RIPs and the press controllers have still not been diagnosed, the flow returns to operation 540 to load the rule set for each of these computer systems. For RIP 262, diagnosis may involve checking some or all of the same attribute categories (e.g., CPU, memory, system, array controllers, volumes, network, processes, services, and environment variables) and specific attributes checked for the system manager. An advantage of the embodiments of the invention is that the respective rule set for each computer system can be adapted by the product manufacturer to best suit the manufacturer's or customer's needs. In operation 568, a report based on this computer system's diagnosis may be generated for RIP 262, and like that for system manager 210, this report may include a summary of flagged items and a listing of the attributes of the computer system even if they do not deviate from the expected configuration.

The diagnostic system may continue to check each of the computer systems in the product using the specific rule set for each computer system's configuration. A report of each computer system's diagnosis may be generated. When the last computer system has been diagnosed, in operation 590, a diagnostic report for the entire product may be generated. This report may include the information from all of the computer systems' diagnoses, and, like the individual computer systems' reports, may include a summary of flagged items and a listing of the attributes of the computer systems even if they do not deviate from the expected configuration, as well as list the computer systems that make up the product.

Note that although the previous example included a system manager, several RIPs, and several press controllers, a single computer system may perform more than one function (e.g., a "combo"), and the computer system may be analyzed differently depending on the function it performs. For example, a computer system may be a system manager, RIP, and press controller, with a rule lookup key "sm1_combo" and the rule set used may be "sm1_combo_rules.txt." But while the components of the system may be the same, the rule set may differ, and thus different diagnostic reports may be generated for each separate function.

Benefits of implementing diagnosis system and methods according to embodiments of this invention may include the ability to (1) define multiple hardware and software permutations which may be used to configure the diagnostic system such that the diagnostic routines executed against the current hardware/software system are appropriate for that hardware/software system; (2) increase the accuracy and correctness of a diagnostic analysis so that the product support technicians can rapidly address customer problems; (3) upgrade the diagnostics system with new rules when new hardware/software permutations become available; and (4) execute the diagnostics system remotely without the need for an on-site customer visit. Other or different benefits may also be achieved.

In sum, methods and systems are described that may provide consistency, completeness, and accuracy in diagnosing a computer system. A diagnostic system may be used to provide a diagnostic assessment of hardware and software configurations for multiple platforms. The diagnostic system may use predefined rules in a diagnostic rule set to determine whether a system is configured and operating to specification based upon those rules.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:
1. A method comprising:
   determining a rule lookup key based on a machine usage context, a hardware configuration, and a software configuration for a computer system to be diagnosed;

retrieving a diagnostic rule set associated with said rule lookup key; and executing the diagnostic rule set on said computer system.

2. The method of claim 1, further comprising generating a diagnostic report for the computer system.

3. The method of claim 1, wherein the computer system is part of a product system, and further comprising executing a second diagnostic rule set on a second computer system within said product system.

4. The method of claim 3, further comprising generating a diagnostic report for the product system.

5. The method of claim 3, wherein said product system is a printing system.

6. The method of claim 1, further comprising upgrading said diagnostic rule set with at least one different rule.

7. The method of claim 6, wherein said upgrading is performed via the Internet.

8. The method of claim 1, wherein the diagnostic rule set resides on the computer system.

9. The method of claim 1, wherein the diagnostic rule set is accessed via the Internet.

10. The method of claim 1, wherein the executing is performed remotely.

11. A system comprising:

a computer and peripherals arranged in a first configuration comprising a machine usage context, a hardware configuration, and a software configuration, wherein said computer includes a diagnostic rule set designed for said first configuration and to be executed on said system, and wherein said diagnostic rule set is associated with a rule lookup key based on said first configuration.

12. The system of claim 11, wherein the system is part of a product system.

13. The system of claim 12, wherein the computer and peripherals are arranged in a second configuration.

14. The system of claim 12, further comprising a second computer and peripherals arranged in a second configuration.

15. The system of claim 14, wherein a second diagnostic rule set is executed on said second computer and peripherals.

16. The system of claim 14, wherein the second configuration comprises a machine usage context, a hardware configuration, and a software configuration.

17. A method comprising:

diagnosing a computer system using a diagnostic rule set, wherein the diagnostic rule set is associated with a rule lookup key based on a machine usage context, a hardware configuration, and a software configuration;

analyzing the computer system for changes in one or more attributes compared to a previous time instance;

modifying the rules in the diagnostic rule set based on said attribute changes; and executing on the computer system the modified diagnostic rule set.

18. The method of claim 17, wherein the analyzing is performed during runtime of the computer system.

19. The method of claim 17, wherein said attributes comprise the machine usage context, the hardware configuration, and the software configuration.

20. The method of claim 17, wherein said attributes comprise the behavior or performance of the computer system.

* * * * *